United States Patent [19]

Farahati

[11] Patent Number: 5,185,747
[45] Date of Patent: Feb. 9, 1993

[54] DATA SYMBOL ESTIMATION
[75] Inventor: Nader Farahati, Cambridge, England
[73] Assignee: Technophone Ltd., Surrey, England
[21] Appl. No.: 882,360
[22] Filed: May 6, 1992

Related U.S. Application Data

[63] Continuation of Ser. No. 605,981, Oct. 30, 1990, abandoned.

[30] Foreign Application Priority Data

Nov. 29, 1989 [GB] United Kingdom ............... 8927005

[51] Int. Cl.$^5$ ............................................. G06F 11/10
[52] U.S. Cl. ................................................. 371/43
[58] Field of Search ............................. 371/43, 44, 45

[56] References Cited

U.S. PATENT DOCUMENTS

| | | | |
|---|---|---|---|
| 4,675,871 | 6/1987 | Gordon et al. | 371/43 |
| 4,730,322 | 3/1988 | Pollara-Bozzola | 371/43 |
| 4,797,887 | 1/1989 | Yamasaki et al. | 371/43 |
| 4,847,871 | 7/1989 | Matsushita et al. | 375/43 |
| 4,932,029 | 6/1990 | Heichler | 371/43 |
| 4,941,154 | 7/1990 | Wei | 371/43 |

FOREIGN PATENT DOCUMENTS 0302330 8/1989 European Pat. Off. .

OTHER PUBLICATIONS

Bhargava, Forward Error Correction Schemes for Digital Communications, IEEE Communications Magazine, 21 (1983) Jan., No. 1, New York, USA pp. 11-19.
Fettweis et al., Parallel Viterbi Algorithm Implementation; Breaking the ACS Bottleneck, IEEE Transactions On Communications, 37 (1989) Aug., No. 8, New York USA pp. 785-789.

Primary Examiner—Charles E. Atkinson
Attorney, Agent, or Firm—Perman & Green

[57] ABSTRACT

A method of estimating a digitized data signal transmitted as a sequence of data symbols. The received signal is generally distorted by transmission through a dispersive communications channel. The received symbols can exist in a plurality of different states depending on the number of symbols in the data alphabet and the extent of intersymbol interference. In the present method a near-instaneous soft decision is made (without the need for memory storage) for each estimated symbol using the following main steps. 1) Determine for each state at a given time increment k the respective partial path metric ($M_A$) in respect of the state transition corresponding to the transmission of a first symbol type (A). 2) Determine for each state at the same time increment k the respective partial path metric ($M_B$) in respect of the state transition corresponding to the transmission of a second symbol type (B). 3) Select the maximum value ($M_{Amax}$ and $M_{Bmax}$) of the first and second symbol type partial path metrics. 4) Difference the two maximum values at step 3 to yield an estimate of the transmitted data symbol in the form of a soft decision. The soft decision has the advantage that it conveys confidence level information about the estimate or decision made.

10 Claims, 4 Drawing Sheets

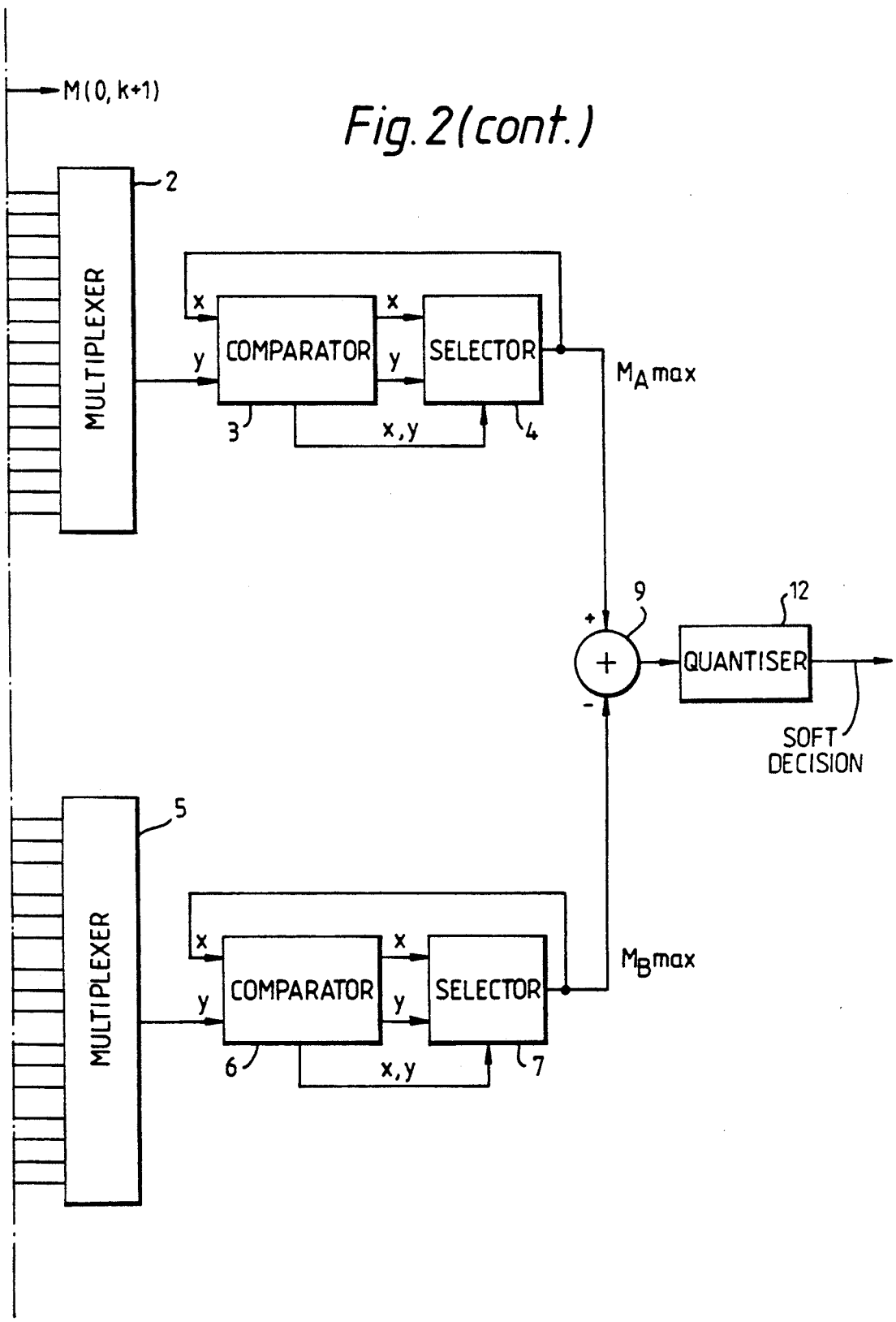

DATA SYMBOL ESTIMATION

This is a continuation of copending application Ser. No. 07/605,981 filed on Oct. 30, 1990, now abandoned.

This invention relates to a method and apparatus for estimating a data symbol in a sequence of transmitted data symbols received over a communication channel and has particular, but not exclusive application, in the equalization of data transmitted over radio channels. In the present specification digitised signals are referred to as data.

BACKGROUND OF THE INVENTION

The problem of intersymbol interference resulting from transmission of data on dispersive communication channels is known and an equalization process is effected on the received signal in order to estimate the individual data symbols which were originally transmitted. Various types of equalizer are know but of particular interest in the present context are so-called Viterbi equalizers based on the Viterbi algorithm, which are a form of maximum likelihood (ML) detector.

Furthermore, for the purpose of forward error correction, data may be convolutionally encoded before it is transmitted. (Forward error correction means that the data is corrected at the receiver without the need for retransmission). A Viterbi detector may also be used for decoding convolutionally encoded data.

In the context of ML detection, a trellis diagram is commonly used to represent the progression of states with the passage of time. It is noted here that the number of states S is given by the equation $S=N^c$ where N is the number of symbols in the data alphabet used and C is the constraint length (i.e. extent of intersymbol interference). Thus for a 2-symbol alphabet and a constraint length of 4 there are 16 possible states.

The term 'node' is usually used to designate a particular state at a particular time on a trellis diagram.

The arc or path representing the transition between two states (nodes) adjacent in time is known as a 'branch' and the associated 'branch metric' is an indication of the likelihood of the particular transition occurring. The 'partial path metric' represents the overall probability that a particular partial path to the left of the node under consideration represents the correct sequence of state transitions. The term 'partial path' is construed accordingly. This is the meaning of the terms partial path and partial path metric as they are used in the present specification, but the terms 'path' and 'path metric' may also be used to convey the same meaning. The overall path i.e. the path between the beginning and the end of the trellis which has the maximum path metric is the maximum likelihood path which essentially represents the best estimate of the data symbols actually transmitted.

For the avoidance of doubt, it is emphasized here that the path metric is a numerical value indicating the relative likelihood (probability) of a particular transition taking place. Throughout this specification the convention has been adopted that the maximum path metric represents the maximum likelihood, but depending on the manner in which the path metric is determined the converse may equally hold true, namely that the maximum likelihood may be represented by a minimum path metric. Therefore the term 'maximum' as used in this specification must be understood to include 'minimum' and likewise the words 'larger' and 'smaller' (and like terms) must be understood to include their converse meanings, viz 'smaller' and 'larger' respectively.

In theory a maximum likelihood (ML) or maximum a-posteriori (MAP) detector may be used to calculate the branch metrics for every branch in the trellis diagram and then determine the path metric for every path in the trellis diagram, and finally choose the path for which the overall path metric is a maximum. The sequence of symbols corresponding to this path is the estimate of the symbols actually transmitted. The difficulty with this approach is that the number of paths increases exponentially as the trellis diagram is traversed from left to right.

The Viterbi detector (mentioned earlier) is a computationally more efficient version of a ML detector which exploits the special structure of the detector to achieve a complexity that grows linearly rather than exponentially along the trellis. Hence, a Viterbi detector has the advantage that it requires a constant computation rate per unit time. For each node, the Viterbi detector selects the path having the largest partial path metric, called the 'survivor path' for that node. All partial paths other than the survivor path are discarded because any other partial path has by definition a smaller partial path metric, and hence if it replaced the survivor path in any overall path, the path metric would be smaller.

At each stage of the trellis it is not known which node the optimal path must pass through and so it is necessary to retain one survivor path for each and every node. The symbol associated with the survivor path, called the 'survivor', and the associated path metric have to be stored in memory for each node at a stage representing a particular time in order for the algorithm to proceed to the next stage at time increment $t+1$.

Only when the terminal node of the trellis has been reached is it possible to determine the unique path of maximum likelihood representing the estimation of the symbols actually transmitted. It is only at this stage that the estimated data symbols can be read off by effecting a "trace-back" along the identified maximum likelihood path.

The decisions made by a conventional Viterbi detector are 'hard' decisions in the sense that the estimated data symbols are restricted to correspond exactly to the data symbols of the particular alphabet used. For example, in the case of a 2-symbol alphabet the estimated data symbols are in strict binary digitized form (i.e. expressed in terms of only two levels, e.g. 0 and 1).

The known Viterbi detector has the drawback that an appreciable time delay occurs between detection and output. There are two main factors contributing to this delay. Firstly there is the so-called "truncation length" which is the temporal length of the survivor information stored in memory and secondly there is the so-called "trace-back delay" which is the time taken to process the survivor information, i.e. the time between storing the survivor information in memory and outputting the estimated data decisions. The total time delay may typically amount to, say 70 bits which, by way of example, at a bit transmission rate of 270kb/s would correspond to a significant time delay of 0.26ms. This time lag is undesirable in data receivers generally, but is especially detrimental in the case of voice communication applications.

In addition it has to be noted that a Viterbi detector requires substantial memory capacity to store the survivor information.

European patent application EP-A-0,302,330 relates to a method of evaluating metrics for Viterbi decoding of convoluted code signals in which individual path decisions are made for each state by comparing the pair of 'opposing' path metrics, i.e. the path metrics associated respectively with two different symbol types [designated $M_A(x,k+1)$ and $M_B(x,k+1)$ in the present application]. For each state the first path metric [$M_A(x,k+1)$] of the opposing pair is calculated by adding the current branch metric [$b(x,k+1|x_A,k)$] relating to a first symbol type [A] to the respective previous partial path metric [$M(x_A,k)$] and the second path metric [$M_B(x,k+1)$] of the pair is calculated by adding the current opposed branch metric [$b(x,k+1|x_B,k)$], i.e. relating to a second symbol type [B], to the respective previous partial path metric [$M(x_B,k)$]. The two opposing path metrics are differenced [$M_A(x,k+1)-M_B(x,k+1)$] to yield a path decision for each state. Thus, in the case of sixteen states, sixteen path decisions (denoted DEC0, DEC1, ... DEC15 in EP-A-0,302,330) will be made. Although that patent specification is not explicit in this regard, it is assumed that these path decisions are all stored in memory for selection and read back at a subsequent trace-back stage in the conventional manner of a Viterbi decoder. Also, for each state the two opposing path metrics are compared and the minimum value (MSEL0, MSEL1,...MSEL15) is selected for use as the previous partial path metric at the next transition stage of the trellis. A further stage (M-AND and PRE-MI) is provided for comparing all the minimum metrics (MSEL0, MSEL1, ... MSEL15) and selecting the overall minimum value (MMIN) which is subtracted as an offset from each of the minimum metric values (MSEL0, MSEL1, ... MSEL15) at each of the sixteen individual stages (viz. at subtractors SUB0, SUB1, ... SUB15) in a process which may effectively be regarded as normalization. Additionally, the maximum of all the sixteen minimum metric values may be determined. The maximum and minimum values of the complete set of minimum metrics (SEL0, SEL1, ... SEL15) may be differenced to provide a so-called differential metric which (as mentioned in passing in EP-A-0,302,330) may be used, for example, for synchronization or for phase ambiguity resolution during Viterbi decoding.

SUMMARY OF THE INVENTION

According to a first aspect of the present invention there is provided a method of estimating a data symbol in a sequence of transmitted data symbols which has become distorted by transmission through a dispersive communications channel, wherein a plurality of different states is associated with the transmission of said data symbols, which method includes the steps of determining for each state the respective partial path metric ($M_A$) in respect of the state transition corresponding to the transmission of a first symbol type (A), determining for each state the respective partial path metric ($M_B$) in respect of the state transition corresponding to the transmission of a second symbol type (B), selecting the maximum value ($M_{Amax}$ and $M_{Bmax}$) of the first and second symbol type partial path metrics respectively, and determining the difference ($M_{Amax}-M_{Bmax}$ or $M_{Bmax}-M_{Amax}$) between the respective maximum values of the first and second symbol type partial path metrics ($M_{Amax}$ and $M_{Bmax}$).

The difference between the respective maximum values of the first and second symbol type partial path metrics may be used directly as an estimate or "decision" of the transmitted data symbol.

An important advantage of a method in accordance with the present invention is that the decisions are made almost instantaneously and continuously, e.g. at the same rate as the symbol sampling rate which may be chosen to be the same as the symbol transmission rate. Certainly this method avoids delay associated with survivor storage and also the trace-back phase which are inherent features of the known Viterbi detector. Also, since the present method avoids the need for storing survivor information no memory is required for this purpose. The processing circuitry can therefore be less complex, and hence less costly in this regard.

Furthermore, the difference between the respective maximum values of the first and second symbol type partial path metrics may be used directly as a value indicative of the confidence level of an estimated data symbol. Thus a method in accordance with the invention has the benefit that it can yield soft decisions. That is to say, the estimated data symbols may be quantized at more levels than there are symbols in the alphabet being used (for example at eight levels in the case of a 2-symbol (binary) alphabet) and thus inherently convey certainty information as regards the confidence level of the decision made. In the case of convolutionally encoded data when soft decisions are decoded a significantly better error rate performance can be achieved for a given signal to noise ratio, as compared to the hard decisions generated by the conventional Viterbi decoder.

In a preferred embodiment the respective selection steps include comparing the partial path metric for each state in turn with a previously selected value to determine and select the larger of the two values.

According to a further aspect of the invention there is provided an arrangement for estimating a data symbol in a sequence of transmitted data symbols which has become distorted by transmission through a dispersive communications channel, wherein a plurality of different states is associated with the transmission of said data symbols, including first means for determining for each state the respective partial path metric ($M_A$) in respect of the state transition corresponding to the transmission of a first symbol type (A), second means for determining for each state the respective partial path metric ($M_B$) in respect of the state transition corresponding to the transmission of a second symbol type (B), means for selecting the maximum value ($M_{Amax}$ and $M_{Bmax}$) of the first and second symbol type partial path metrics respectively, and means for outputting a signal indicative of the difference ($M_{Amax}-M_{Bmax}$ or $M_{Bmax}-M_{Amax}$) between the maximum value of the first symbol type partial path metric ($M_{Amax}$) and the maximum value of the second symbol type partial path metric ($M_{Bmax}$).

Suitably an arrangement in accordance with the present invention includes means for comparing the first symbol type partial path metric for each state with a previously selected value to determine and select the larger of the two values and means for comparing the second symbol type partial path metric for each state with a previously selected value to determine and select the larger of the two values. Also, respective multiplexer means may be provided for applying the partial path metric for each state in turn to the respective comparing means.

In a preferred embodiment the arrangement additionally comprises means for quantising the signal from the outputting means into a plurality of quantization levels greater than the number of symbols in the data alphabet.

BRIEF DESCRIPTION OF THE DRAWINGS

An embodiment of the invention will now be described, by way of example, with reference to the accompanying drawings, in which.

DETAILED DESCRIPTION OF THE INVENTION

Figure 1:
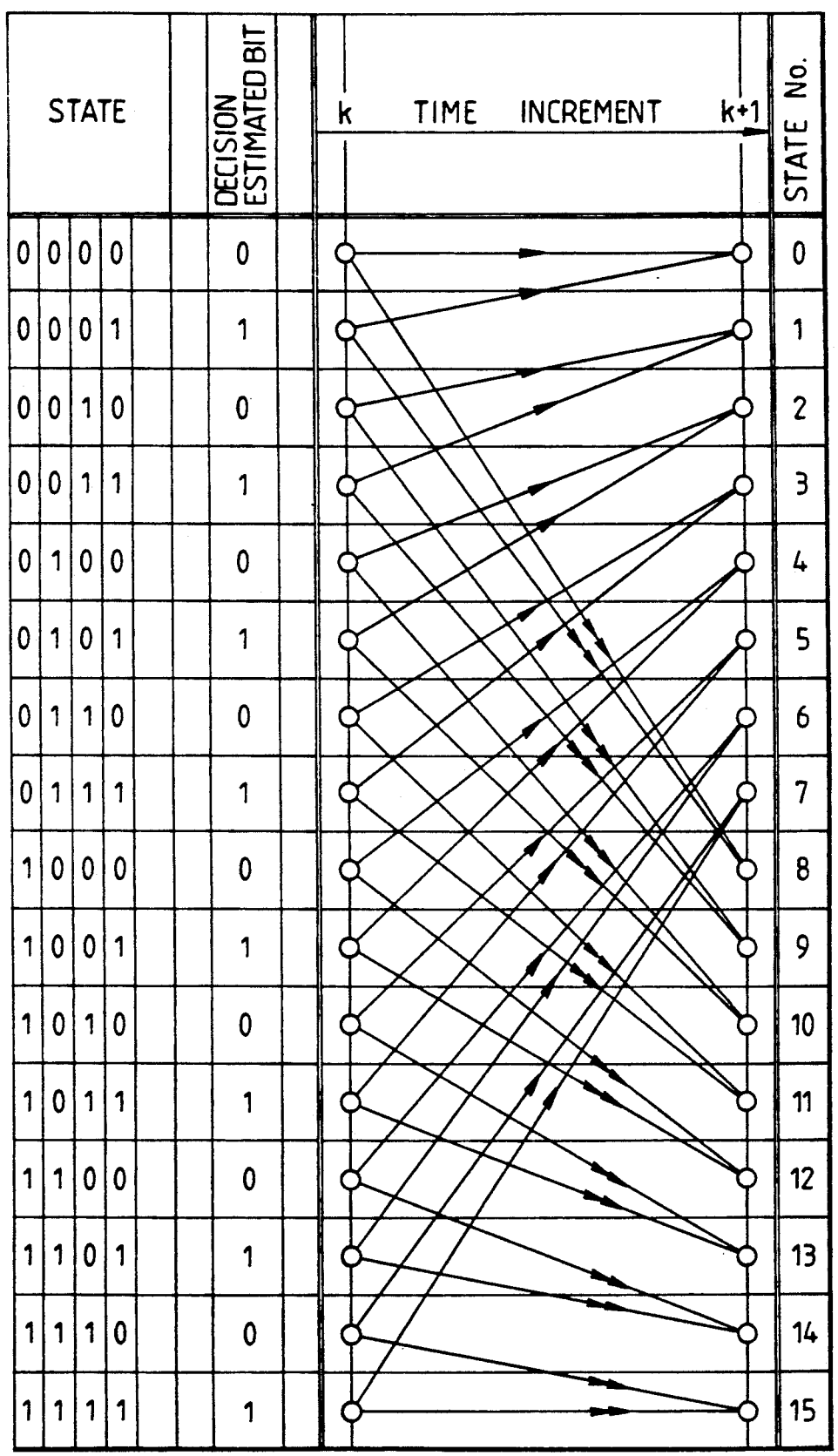
FIG. 1 is a part of a 16-state trellis diagram illustrating the possible state transitions.

FIG. 1 is a part of a trellis diagram for the 16 states associated with a 2-symbol alphabet in the case where the constraint length is 4. The two symbols may, for example, be $+1$ and $-1$ mapped from the single bits 1 and 0 respectively. The states (0000, 0001 ... 1110, 1111) are shown in the left hand (first) column and the decision estimated bit (i.e. the least significant bit) is shown in the column to the right of its respective state. The partial trellis diagram itself shows the state transitions for all 16 states at a time k and an incremented time $k+1$. The time interval between k and $k+1$ corresponds to the time interval between successive transmitted data symbols. Transitions with a single arrowhead represent a 0 transition bit, whereas transitions with a double arrowhead represent a 1 transition bit. By way of explanation, a state transition occurs as a result, of adding the transition bit to the current state in the position of the most significant bit and disregarding the least significant bit (i.e. the decision estimated bit) of the current state. The number of the state (0-15) is shown to the right of the trellis diagram.

In words, the partial path metric for any particular state 0 to 15 at time $k+1$ is given by the sum of the partial path metric at time k plus the branch metric between k and $k+1$. Expressed more mathematically in general terms:

$$M(x_{k+1},k+1) = M(x_k,k) + b(x_{k+1},k+1 | x_k,k)$$

where M is the partial path metric, b is the branch metric, $x_k$ is the state number, and k is the time index. Hence $M(x,k+1)$ is the partial path metric at state number $x_{k+1}$ at time $k+1$; $M(x,k)$ is the partial path metric at state number $x_{k+1}$ at time k; and $b(x,k+1|x,k)$ is the branch metric at state number $x_k$ at time $k+1$ given the state number $x_k$ at time k. The branch metrics can be determined using conventional techniques which will be familiar to a person skilled in the art. Alternatively, a novel multiplier-less approach may be used in accordance with the invention which is the subject of our co-pending European patent application, Publication No. EP 0 430 428 claiming priority from UK patent application No. 8927006.0.

It can be seen from the trellis diagram that for each state at time $k+1$ there are two possible state transitions leading to that state. For each state one of these transitions corresponds to the transmission of one of the data symbols and the other transition corresponds to the transmission of the other data symbol. For the sake of generality these two symbols will now be referred to as A and B respectively, where A and B represents any binary alphabet mapped from the bits 0 and 1 respectively.

The partial path metrics can now be expressed more accurately for the two possible state transitions in the following general terms.

1) $M_A(x,k+1) = M(x_A,k) + b(x,k+1|x_A,k)$ for symbol A; and
2) $M_B(x,k+1) = M(x_B,k) + b(x,k+1|x_B,k)$ for symbol B.

Considering state number 0 at time $k+1$ and using the notation established above the respective partial path metrics of the two possible state transitions are given by:

1) $M_A(0,k+1) = M(0,k) + b(0,k+1|0,k)$ for symbol A; and
2) $M_B(0,k+1) = M(1,k) + b(0,k+1|1,k)$ for symbol B.

Likewise at state number 1, the two partial path metrics corresponding to a transmitted A and B symbol are:

1) $M_A(1,k+1) = M(2,k) + b(1,k+1|2,k)$ for symbol A; and
2) $M_B(1,k+1) = M(3,k) + b(1,k+1|3,k)$ for symbol B.

and so on until for example at state number 8 the situation is:

1) $M_A(8,k+1) = M(0,k) + b(8,k+1''0,k)$ for symbol A; and
2) $M_B(8,k+1) = M(1,k) + b(8,k+1|1,k)$ for symbol B.

At the last state number 15 the corresponding equations are:

1) $M_A(15,k+1) = M(14,k) + b(15,k+1|14,k)$ for symbol A; and
2) $M_B(15,k+1) = M(15,k) + b(15,k+1|15,k)$ for symbol B.

Figure 2:
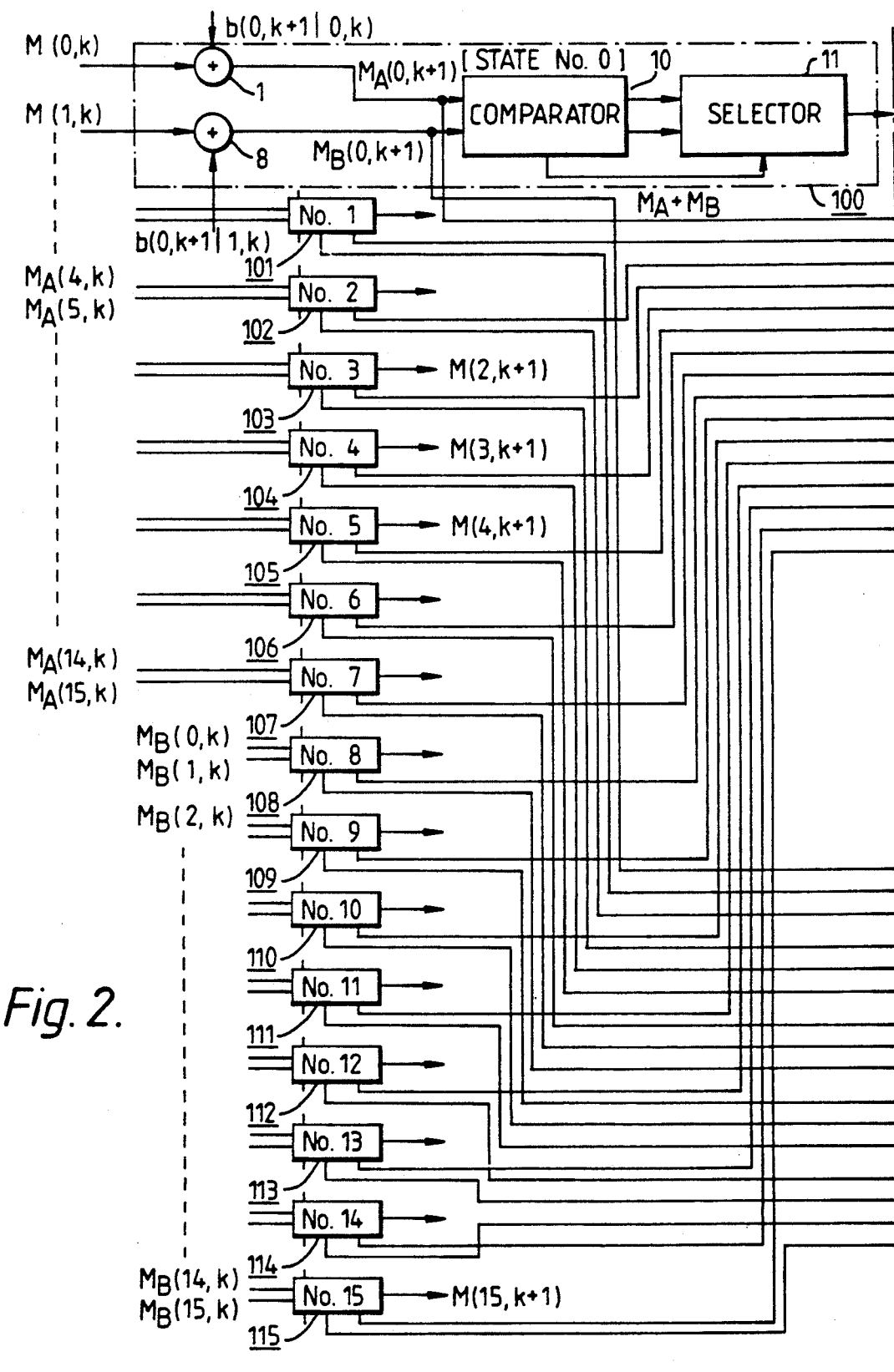
FIG. 2 is a schematic diagram showing an arrangement for estimating a data symbol in accordance with the invention.

The arrangement in FIG. 2 shows how the partial path metric information is processed to derive an almost immediate estimate of the current data symbol at time $k+1$.

Firstly consider state number 0. The value of the partial path metric $M(0,k)$ is input into an adder 1 and the value of the branch metric $b(0,k+1|0,k)$ is input into the same adder 1. The two values are summed to give the partial path metric $M_A(0,k+1)$ corresponding to the transmission of a symbol A. The value of $M_A(0,k+1)$ is input to a multiplexer 2. Fifteen other inputs from processing blocks 101-115 respectively are likewise input to the multiplexer 2, in the following order $M_A(1,k+1)$, $M_A(2,k+1)$... $M_A(15,k+1)$ being the values of the partial path metrics at each of the fifteen remaining states numbered 1 to 15 respectively and corresponding to the transmission of a transmitted data symbol A. The processing blocks 101-115 for states 1 to 15 respectively are all functionally equivalent to the processing block 100 for state 0, shown bounded by a chain line in FIG. 2. Under the control of a clock (not shown) the multiplexer transmits each of the partial path metric input values as a first input y to a comparator 3. The second input x to the comparator may initially be set at 0. The comparator indicates which is the larger of the two values x and y and the subsequent selector stage 4 selects the larger of the two values and feeds it back to the input x of comparator 3. The input x thus remains constant unless the input at y is greater in which case the input x assumes the higher value. Having compared all 16 partial path metrics the selector outputs the maximum value of the partial path metric for the symbol A over all sixteen states. This value is represented as $M_{Amax}$.

In an exactly analogous manner a separate arrangement of a multiplexer 5, comparator 6 and selector 7 are used to determine the maximum value of the partial path metrics for the B symbol over all sixteen states. Thus the multiplexer 5 has sixteen inputs, viz. $M_B(0,k+1)...M_B(15,k+1)$ being the values of the partial path metrics at each of the sixteen states respectively and corresponding to the transmission of a data symbol B.

The drawing shows how the value $M_B(0,k+1)$ is determined at adder 8 by summing the value of the partial path metric $M(1,k)$ and the value of the branch metric $b(0,k+1|1,k)$ in accordance with the equation given above. The equivalent process is carried out at each of the fifteen remaining states to determine the respective partial path metric for the B symbol. The comparator 6 and selector 7 are effective to output the maximum value of the partial path metric for the symbol B over all sixteen states. This value is represented as MBmax. The value $M_{Amax}$ from selector 4 is fed to an adder 9. The value $M_{Bmax}$ is inverted (made negative) and also fed to the adder 9 which thus combines the two input values to give the difference $M_{Amax} - M_{Bmax}$. This is an immediate estimate of the currently observed data symbol in the form of a soft decision. Entirely by way of example, the Applicants have used a quantiser 12 to quantise the estimated data symbols into eight levels. The output from the quantiser 12 in this case is a sequence of three bits where 000 represents a first transmitted data symbol of the binary pair (i.e. A or $-1$) with maximum certainty, 001 represents the same data symbol with less certainty, 010 represents the same data symbol with even less certainty and 011 represents the same data symbol with minimum certainty. On the other hand 111 represents the other symbol of the binary pair (hence B or $+1$) and 110, 101, and 100 represent the same symbol with gradually decreasing certainty.

It is noted that, depending on the internal arithmetic precision, the output from the adder 9 may already be quantized at the desired number of levels, in which case the quantiser 12 can be dispensed with.

So far the description has been limited to the estimation of an individual data symbol. However, the same basic scheme can be repeated at each stage (time increment) of the trellis to estimate the entire sequence of transmitted symbols. Such a process is generally known in the art as signal equalization.

To this end the arrangement shown in FIG. 2 includes additional stages to those already described as follows.

For each state 0 to 15 a further comparator 10 and selector 11 are provided within the respective processing blocks 100–115. (For the sake of clarity in FIG. 2 the comparator 10 and selector 11 are actually shown only in the processing block 100, but the other processing blocks 101–115 correspond). Each comparator compares the two respective inputs at a given time, say k+1, corresponding to the partial path metrics corresponding to the transmission of an A and B symbol respectively. Thus as shown in FIG. 2 for state number 0 the output $M_A(0,k+1)$ from adder 1 and the output $M_B(0,k+1)$ from adder 8 are applied to the comparator 10 and selector 11 which gives an output $M(0,k+1)$ corresponding to the maximum value of this pair of partial path metrics. This indicates the maximum likelihood path to the current state, so that the other path can be discarded. This information is used to estimate the transmitted data signal at the next successive increment k+2 when, in order to proceed along the trellis, it is necessary to know the partial path metric for each state at time k+1. Thus this same comparison and selection process is carried out in parallel for each of the sixteen states at each time increment.

In the case of convolutional channel code introduced for the purpose of error correction, the full sequence of estimated data symbols may be further processed by a decoder. The decoder may suitably be a conventional Viterbi decoder since only hard decisions are required at the decoder output. Alternatively, a decoder in accordance with the present invention may be employed, wherein only the hard decision component of the soft decision is utilized. The availability of soft decisions at the decoder input enables the overall bit error performance to be improved compared with hard decisions, since the decoder is able to utilize the certainty information in arriving at a final more accurate decision.

The decoder is used for recovering the original data from data which has been convolutionally encoded before transmission. In this case the partial path metrics $J_k$ are given by the equation $$J_k = J_{k-1} + \sum_{i=1}^{R} \pm \text{(soft decision)}_i$$

where $J_{k-1}$ is the previous partial path metric and R is the inverse of the code rate (i.e. R=2 for half rate code, R=3 for third rate code and so on, where the code rate indicates the redundancy level of the transmitted data, i.e. in half rate code two bits are used to encode a single bit (50% redundancy), and in third rate code three bits are used to encode a single bit (66%) redundancy, etc). The plus or minus sign between terms is determined by the particular mapping scheme used. Suitably, a 1 maps to a plus sign (+) and a 0 maps to a minus sign (−).

Figure 3A:
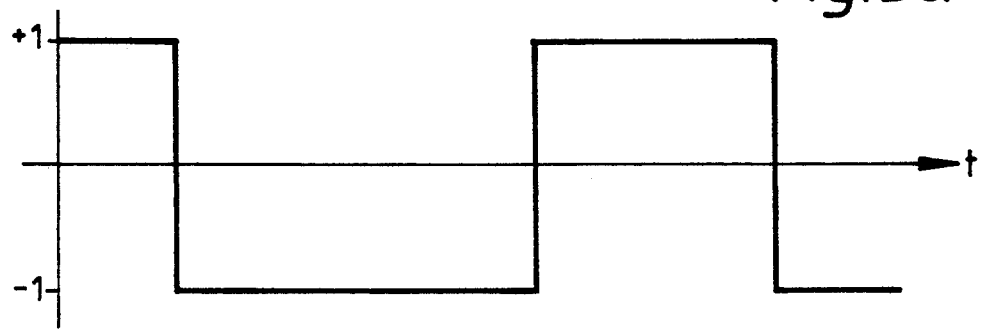
FIGS. 3a, 3b and 3c show a sequence of (a) transmitted data symbols; (b) estimates of the transmitted symbols in the form of hard decisions; and (c) estimates of the transmitted symbols in the form of soft decisions.
Figure 3B:
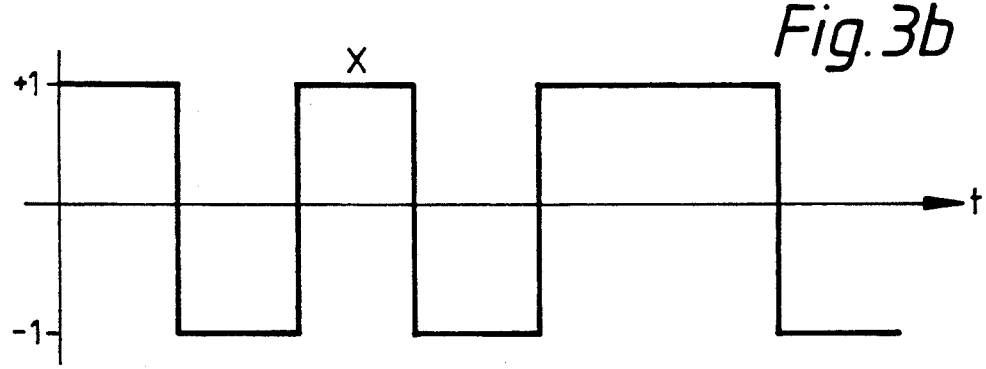
Figure 3C:
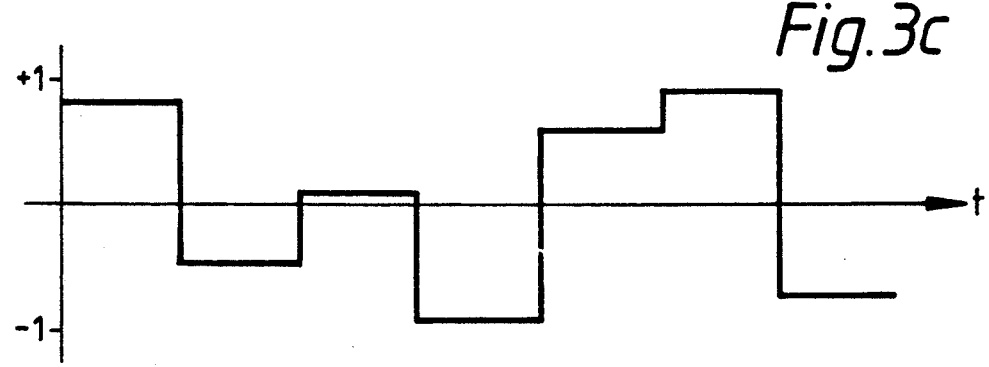

FIG. 3 shows a typical sequence of soft decisions (estimated in accordance with the invention (see FIG. 3c), in contrast to the equivalent hard decisions which may have been made by a prior art Viterbi detector (see FIG. 3b), compared with the original encoded data symbols which were actually transmitted (see FIG. 3a). It can be seen that in the case of the hard decisions a wrong decision was made for the symbol at X. By contrast, in the soft decision case this is estimated as a probable +1 symbol but with minimal certainty. At the decoder stage this uncertainty will be taken into account and may result in the effect of this particular decision with a high level of uncertainty being reversed, i.e. corrected. This is the reason why a receiver incorporating an equalizer in accordance with the invention has the potential to significantly improve the error rate performance for a given signal to noise ratio.

In view of the foregoing description it will be evident to a person skilled in the art that various modifications may be made within the scope of the invention. Also, it is noted that although the above description has concentrated on a binary data alphabet, the present invention is equally applicable to alphabets comprising more than two symbols. In this case the set of symbols may always be divided and re-divided symmetrically into sub-sets of symbols until there is ultimately a plurality of sub-sets each comprising only two symbols and the method of the present invention is then applied in respect of each such sub-set of two symbols as it applies to the two symbols (A and B) constituting a binary alphabet within that sub-set.

Finally, it is also noted that the decisions obtained using a method in accordance with the present invention may be combined with respective hard decision information derived separately using conventional Viterbi techniques. Thus, for example the hard decision may be used to represent the sign of the decision estimated bit (where a plus sign is mapped to 1 and a minus sign is mapped to 0) while the decision obtained using the present method is used to indicate the confidence level of the hard decision.

I claim:

1. A Viterbi detector comprising:
   (a) means for receiving a sequence of data symbols transmitted over a communications channel, said data symbols representing input amplitude values susceptible to interference between adjacent symbols, wherein a plurality of different states is associated with the transmission of said data symbols,
   (b) a first set of processing means for generating for each state a respective partial path metric in respect of the state transition corresponding to the transmission of a first symbol type,
   (c) a second set of processing means for generating for each state a respective partial path metric in respect of the state transition corresponding to the transmission of a second symbol type,
   (d) means for comparing the first symbol type partial path metrics and selecting the maximum value thereof,
   (d) means for comparing the first symbol type partial path metrics and selecting the maximum value thereof,
   (e) means for comparing the second symbol type partial path metrics and selecting the maximum value thereof, and
   (f) means for generating an output signal in accordance with the difference between the maximum value of the first symbol type partial path metric and the second symbol type partial path metric, wherein said output signal represents a detected value for the received data symbol i.e. the most likely value for the observed symbol taking into account the possibility of errors due to interference between adjacent symbols.

2. A viterbi detector as claimed in claim 1, wherein said output signal additionally represents the level of certainty of the detected value for the observed data symbol.

3. A viterbi detector as claimed in claim 2, including means associated with the output signal generating means for quantizing the output signal into a plurality of quantization levels greater than the number of symbols in the data alphabet.

4. A viterbi detector as claimed in claim 1, wherein said means for comparing the first symbol type partial path metrics and for selecting the maximum value thereof comprises means for comparing the first symbol type partial path metric for each state with a previously selected value to determine and select the larger of the two values, and said means for comparing the second symbol type partial path metrics and selecting the maximum value thereof comprises means for comparing the second symbol type partial path metric for each state with a previously selected value to determine and select the larger of the two values.

5. A viterbi detector as claimed in claim 1, including respective multiplexing means for applying the partial path metric for each state in turn to the respective comparing means.

6. A viterbi decoder comprising:
   (a) means for receiving a sequence of convolutionally encoded data symbols transmitted over a communications channel, the convolutional encoding being analagous to the transmission of data through a dispersive communications channel in which the data symbols are susceptible to interference between adjacent symbols, wherein a plurality of different states is associated with the transmission of said data symbols,
   (b) a first set of processing means for generating for each state a respective partial path metric in respect of the state transition corresponding to the transmission of a first symbol type,
   (c) a second set of processing means for generating for each state a respective partial path metric in respect of the state transition corresponding to the transmission of a second symbol type,
   (d) means for comparing the first symbol type partial path metrics and selecting the maximum value thereof,
   (e) means for comparing the second symbol type partial path metrics and selecting the maximum value thereof, and
   (f) means for generating an output signal in accordance with the difference between the maximum value of the first symbol type partial path metric and the second symbol type partial path metric, wherein said output signal represents a decoded value for the received data symbol.

7. A viterbi decoder as claimed in claim 6, wherein said output signal additionally represents the level of certainty of the decoded value for the received data symbol.

8. A viterbi decoder as claimed in claim 7, including means associated with the output signal generating means for quantizing the output signal into a plurality of quantization levels greater than the number of symbols in the data alphabet.

9. A Viterbi decoder as claimed in claim 6, wherein said means for comparing the first symbol type partial path metrics and for selecting the maximum value thereof comprises means for comparing the first symbol type partial path metric for each state with a previously selected value to determine and select the larger of the two values, and said means for comparing the second symbol type partial path metrics and selecting the maximum value thereof comprises means for comparing the second symbol type partial path metric for each state with a previously selected value to determine and select the larger of the two values.

10. A viterbi decoder as claimed in claim 6, including respective multiplexing means for applying the partial path metric for each state in turn to the respective comparing means.

* * * * *

UNITED STATES PATENT AND TRADEMARK OFFICE
CERTIFICATE OF CORRECTION

PATENT NO. : 5,185,747
DATED : February 9, 1993
INVENTOR(S) : Farahati

It is certified that error appears in the above-identified patent and that said Letters Patent is hereby corrected as shown below:

In col. 9, lines 32-34, delete "(d) means for comparing the first symbol type partial path metrics and selecting maximum value thereof,".

Signed and Sealed this

Second Day of November, 1993

BRUCE LEHMAN

Attest:

Attesting Officer

Commissioner of Patents and Trademarks